(12) United States Patent
Hsieh

(10) Patent No.: US 7,174,815 B1
(45) Date of Patent: Feb. 13, 2007

(54) HAND TOOL WITH A SWINGING STRUCTURE

(76) Inventor: Chih-Ching Hsieh, No. 367, Pei Yang Road, Feng Yuan City, Taichung Hsien (TW)

( * ) Notice: Subject to any disclaimer, the term of this patent is extended or adjusted under 35 U.S.C. 154(b) by 0 days.

(21) Appl. No.: 11/416,228

(22) Filed: May 3, 2006

(51) Int. Cl.
  *B25B 23/16* (2006.01)
  *B25G 1/00* (2006.01)
  *F16C 11/00* (2006.01)
  *F16D 1/12* (2006.01)
  *F16D 3/00* (2006.01)

(52) U.S. Cl. ............ 81/177.9; 81/177.7; 81/177.8; 403/93

(58) Field of Classification Search ........... 81/177.9, 81/177.7, 177.8; 403/93
  See application file for complete search history.

(56) References Cited

U.S. PATENT DOCUMENTS

| | | | | |
|---|---|---|---|---|
| 4,711,145 A | * | 12/1987 | Inoue | 81/177.1 |
| 4,901,608 A | * | 2/1990 | Shieh | 81/177.8 |
| 5,199,335 A | * | 4/1993 | Arnold et al. | 81/177.8 |
| 6,000,302 A | * | 12/1999 | Chiang | 81/177.8 |
| 6,216,567 B1 | * | 4/2001 | Hu | 81/177.9 |
| 6,220,125 B1 | * | 4/2001 | Lan | 81/177.9 |
| 6,848,345 B2 | * | 2/2005 | Lin | 81/177.8 |
| 6,857,341 B1 | * | 2/2005 | Cheng | 81/177.8 |
| 7,000,507 B1 | * | 2/2006 | Lin | 81/177.9 |
| 7,036,403 B2 | * | 5/2006 | Lin | 81/177.8 |
| 7,051,625 B1 | * | 5/2006 | Lee | 81/177.8 |

* cited by examiner

*Primary Examiner*—Lee D. Wilson
*Assistant Examiner*—Alvin J Grant
(74) *Attorney, Agent, or Firm*—Troxell Law Office, PLLC

(57) ABSTRACT

A hand tool with a swinging structure, including a head section, a handle connected with the head section via at least one swinging joint and a shift button and a resilient unit disposed at the swinging joint. The swinging joint is composed of a first pivot end and a second pivot end pivotally connected with each other. The second pivot end includes a first and a second lugs and a base section connected therebetween. A stopper section is disposed on the base section. A stopper block is formed on an inner face of the shift button. The shift button is transversely and back and forth movably positioned between the two pivot ends. The resilient unit serves to resiliently push the shift button toward the first pivot end, whereby a front end of the shift button keeps engaged with the first pivot end. When the shift button is transversely shifted to a disengaged position, the stopper section will not interfere with the stopper block, permitting the swinging joint to swing. When the shift button is shifted to an engaged position, the stopper block is stopped by the stopper section to prevent the shift button from moving rearward so as to fix the swinging joint at a certain angle.

12 Claims, 8 Drawing Sheets

HAND TOOL WITH A SWINGING STRUCTURE

BACKGROUND OF THE INVENTION

The present invention is related to a hand tool, such as a wrench, with a swinging joint, the hand tool has a swinging joint permitting the head section of the tool to swing relative to the handle. The hand tool is equipped with a shift button for locking the swinging joint so as to fix the head section at a certain angle.

U.S. Pat. No. 7,000,507 (corresponding to Taiwanese Utility Model Patent No. M270888) discloses a hand tool having a swingable head section. The head section is fixable by a shift button. The rear end of the head section has a protruding pivot section. The front end of the handle has two lugs defining therebetween a recess. A slope is connected between the two lugs. The pivot section of the head section is positioned in the recess and pivotally connected with the two lugs via a shaft, whereby the head section can swing. A narrower side of the slope is spaced from the pivot section by a narrower distance, while a wider side of the slope is spaced from the pivot section by a wider distance. The shift button is laterally movably accommodated in the recess. A front end face of the shift button is formed with teeth for engaging with the teeth formed on a circumference of the pivot section. When the shift button is shifted to the narrower side as shown in FIG. 8 of the aforesaid patent, the shift button cannot be moved rearward, whereby the pivot section is kept engaged with the shift button to fix the head section at a certain angle. Reversely, when the shift button is shifted to the wider side as shown in FIG. 9 of the aforesaid patent, a space is reserved for the shift button to move rearward. Therefore, the shift button can be disengaged from the pivot section, permitting the head section to swing.

However, in the above structure, the slope can hardly reliably locate the shift button in the engaged position. This is because when the shift button is positioned in the engaged position as shown in FIG. 8 of the aforesaid patent, the rear end of the shift button abuts against the slope to keep the shift button engaged with the pivot section. In order to locate the shift button in the engaged position, the aforesaid patent employs a biasing unit for laterally pushing the shift button to prevent the shift button from sliding along the slope. However, the biasing unit provides a resilient force which can hardly sufficiently stops the shift button from moving. In the case that a greater force is applied to the head section to pivot the head section, the head section will exert a pushing force onto the shift button, which force is greater than the stopping force of the biasing unit. As a result, under such circumstance, the shift button will move along the slope toward the disengaged position as shown in FIG. 9 of the aforesaid patent. Therefore, the head section can be hardly truly fixed.

In addition, the rear end of the shift button of the aforesaid patent has a complicated structure and is hard to manufacture.

SUMMARY OF THE INVENTION

It is therefore a primary object of the present invention to provide a hand tool with a swinging structure. At least one swinging joint is located between the handle and the head section of the hand tool. The swinging joint is controlled by a shift button for locking the swinging joint or unlocking the swinging joint. The swinging joint can be reliably fixed.

The present invention can be best understood through the following description and accompanying drawings wherein:

DETAILED DESCRIPTION OF THE PREFERRED EMBODIMENTS

Figure 1:
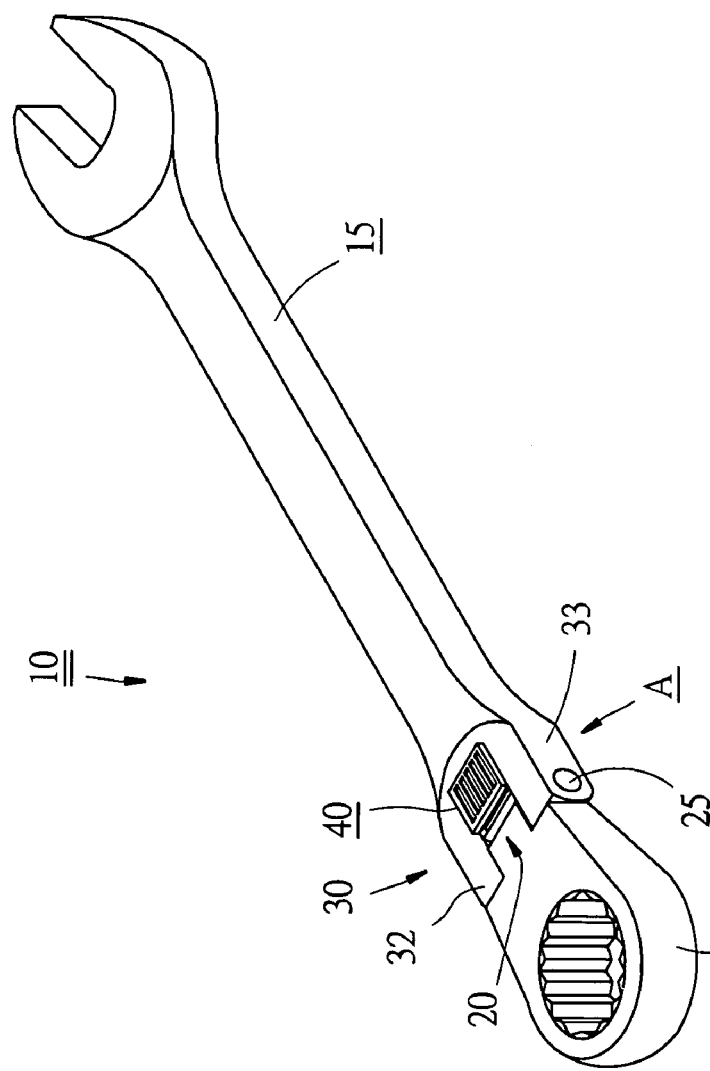
FIG. 1 is a perspective assembled view of a first embodiment of the present invention.
Figure 2:
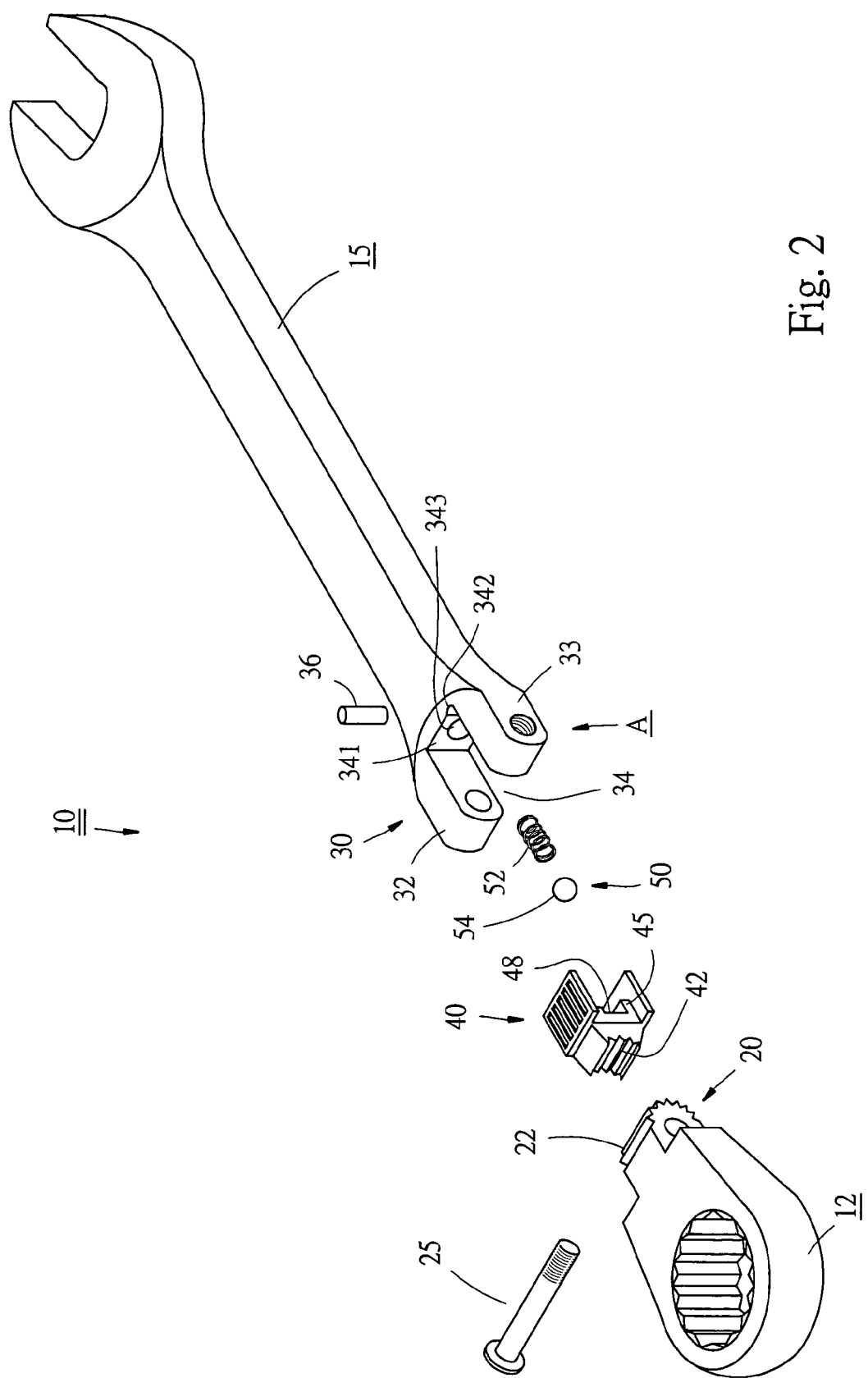
FIG. 2 is a perspective exploded view of FIG. 1.

Please refer to FIGS. 1 and 2. In a first embodiment, the hand tool 10 of the present invention is a wrench. The wrench 10 includes a head section 12, a handle 15, a shift button 40 and a resilient unit 50. The head section and the handle are connected via a swinging joint A.

The swinging joint A is composed of a first pivot end 20 and a second pivot end 30 pivotally connected with each other. The two pivot ends are respectively integrally formed at a rear end of the head section and a front end of the handle. The first pivot end 20 is a lug an outer circumference of which is formed with several teeth 22. The second pivot end 30 is U-shaped and includes two side by side arranged lugs 32, 33 spaced from each other by a certain distance, a cavity 34 is defined therebetween and a base section 341 connected between the two lugs 32, 33.

The first pivot end 20 is inserted in the cavity 34. A shaft 25 is transversely fitted through the two lugs 32, 33 and the first pivot end 20, whereby the head section 12 can swing relative to the handle 15. The outer circumference of the first pivot end 20 is still spaced from the base section 341 by a space 35 as shown in FIG. 5.

A stopper section 36 is disposed on one side of the base section 341 as a step protruding from the base section 341. In this embodiment, a pin member is riveted in a recess 342 formed on the base section 341 to serve as the stopper section 36. Alternatively, the stopper section 36 can be disposed on an inner face of the second lug 33.

Figure 3:
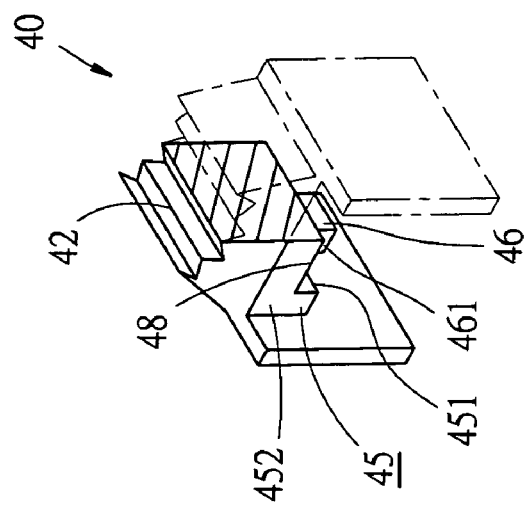
FIG. 3 is a perspective sectional view of the shift button of the present invention.

The shift button 40 is reverse U-shaped and the inside of which is hollow. The shift button has a recessed arced front end face, which is formed with several teeth 42. Referring to FIG. 3, a stopper block 45 is formed on an inner face of the shift button 40. The shift button 40 is positioned in the space 35 and is movable transversely and back and forth.

Figure 6:
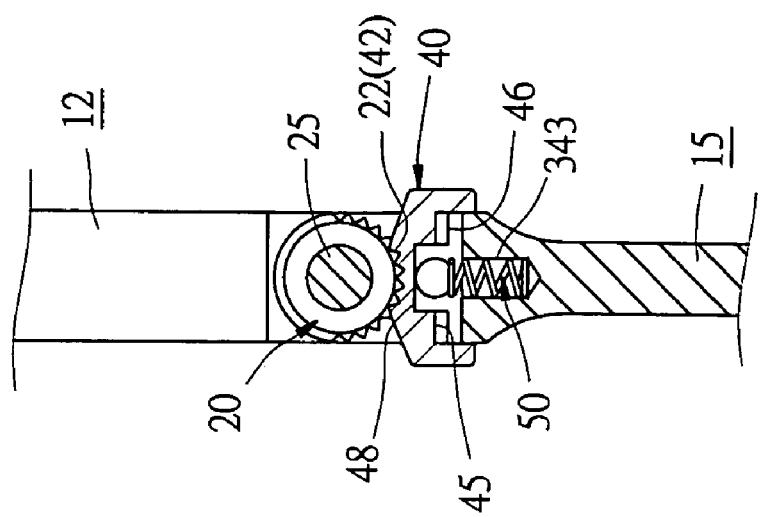
FIG. 6 is a sectional view taken along line 6—6 of FIG. 4.
Figure 4:
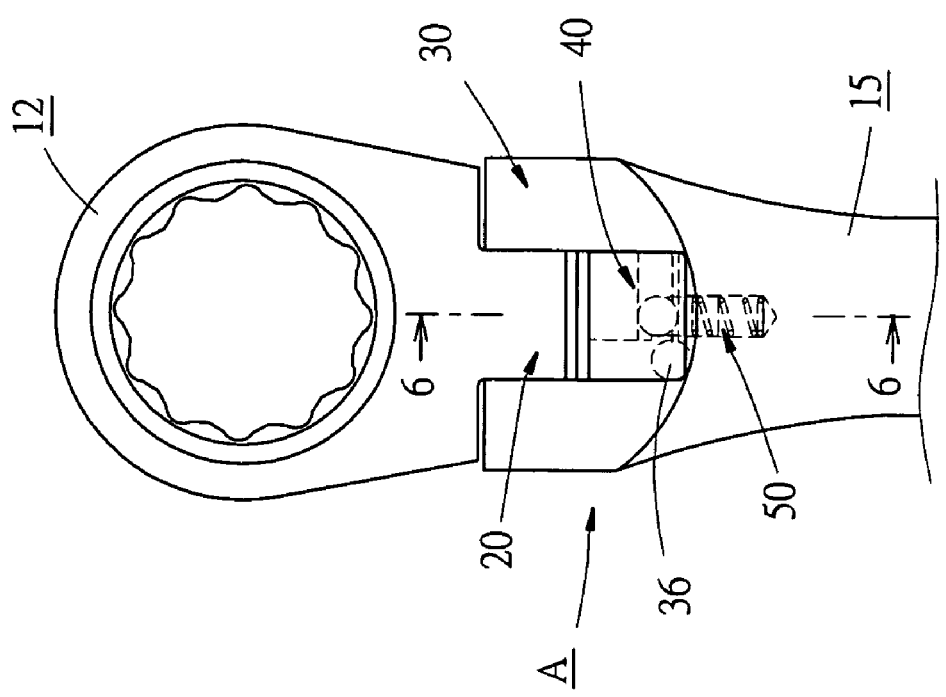
FIG. 4 is a top view of the first embodiment of the present invention.
Figure 5:
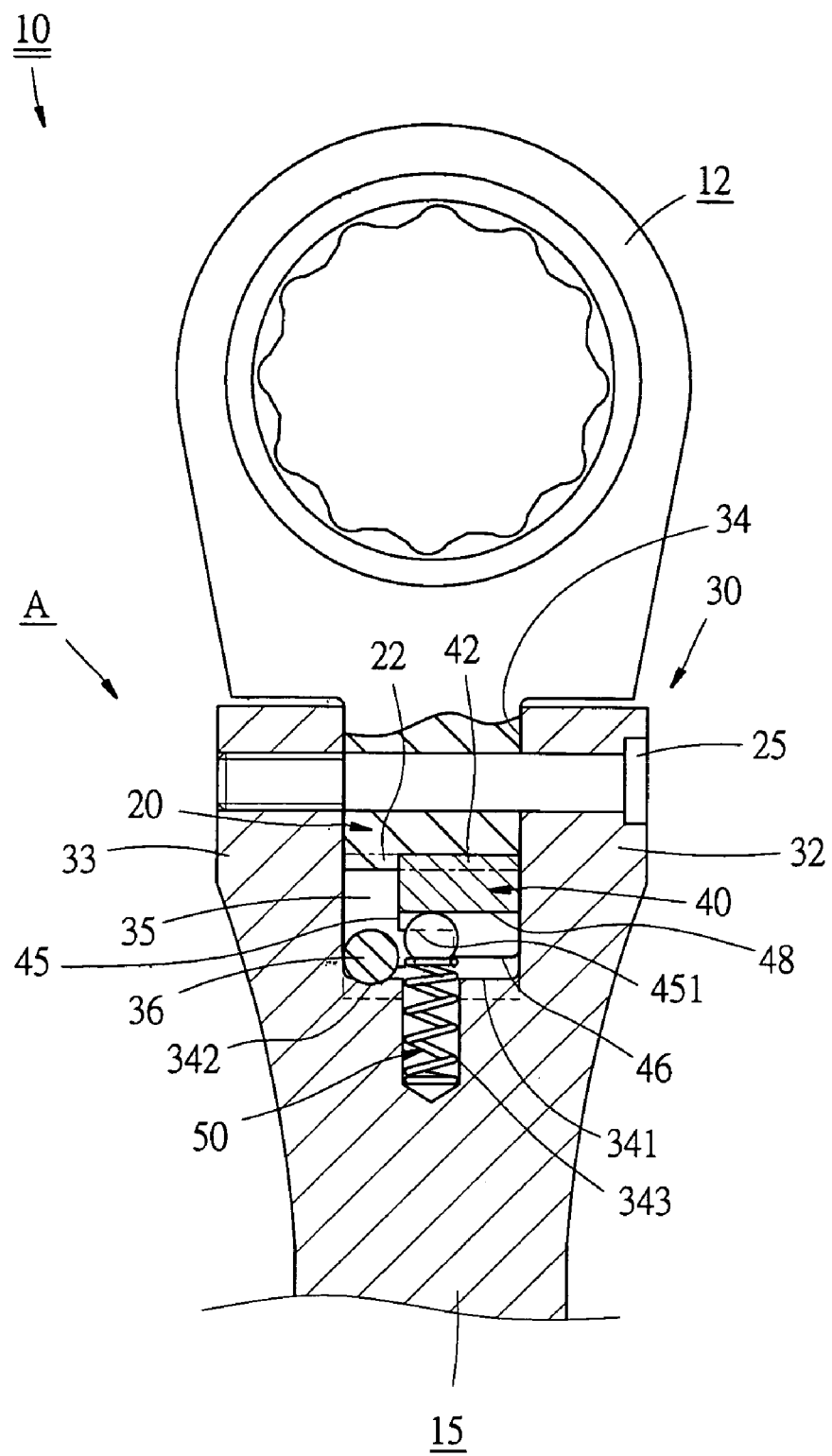
FIG. 5 is a partially sectional view according to FIG. 4.

The resilient unit 50 includes a spring 52 and a steel ball 54 accommodated in a dent 343 formed on the base section 341 of the second pivot end 30 as shown in FIG. 5. The resilient unit 50 serves to resiliently push the shift button 40 forwardly toward the first pivot end 20, whereby the teeth 42 of the shift button 40 keep engaged with the teeth 22 of the first pivot end 20 as shown in FIG. 6.

When the shift button 40 is engaged with the first pivot end 20, a bottom face 451 of the stopper block 45 is higher than the stopper section 36. Therefore, in normal state, the shift button 40 can be horizontally shifted toward the first lug 32 into a disengaged position as shown in FIG. 5. Alternatively, the shift button 40 can be also horizontally shifted toward the second lug 33 into an engaged position as shown in FIG. 7.

It should be noted that there are two measures for locating the shift button in the engaged position. As shown in FIG. 7, a lateral face 452 of the stopper block 45 abuts against the second lug 33 to locate the shift button. Alternatively, a locating block 46 further downward protrudes from the bottom of the stopper block 45 of the shift button 40 as shown in FIG. 3. A lateral face 461 of the locating block 46 is not aligned with the lateral face 452 of the stopper block 45. Accordingly, the lateral face 461 can abut against the stopper section 36 to locate the shift button 40. In addition, in this embodiment, the bottom of the stopper block 45 is formed with a transverse groove 48. The resilient unit 50 extends into the groove 48 to push the shift button 40. No matter whether the shift button 40 is positioned in the disengaged position or the engaged position, the resilient unit 50 always resiliently pushes the shift button 40 to keep the shift button 40 in the disengaged position or the engaged position without sliding.

Figure 8:
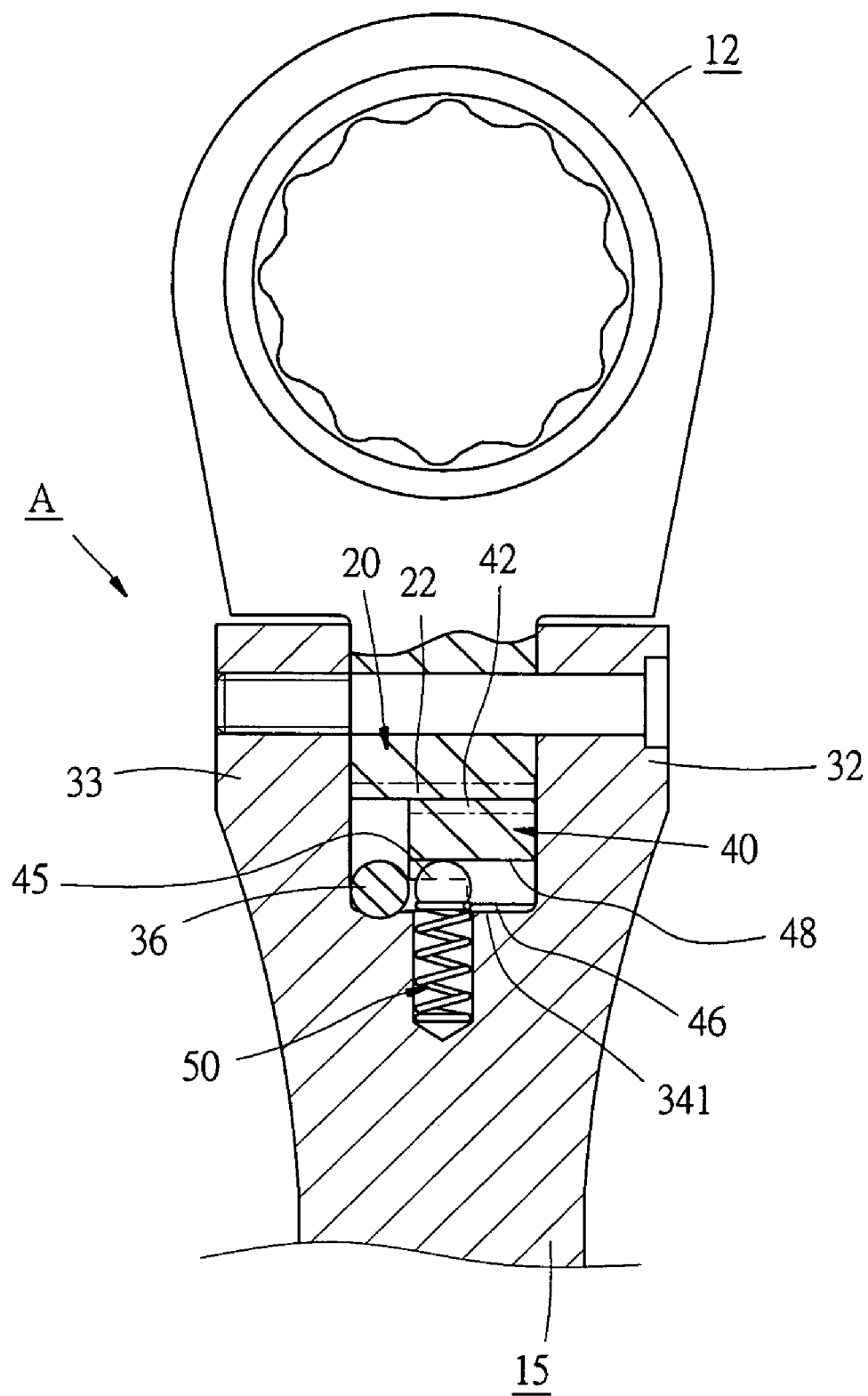
FIG. 8 is a sectional view according to FIG. 5, showing that the swinging joint is unlocked, permitting the head section to swing.
Figure 9:
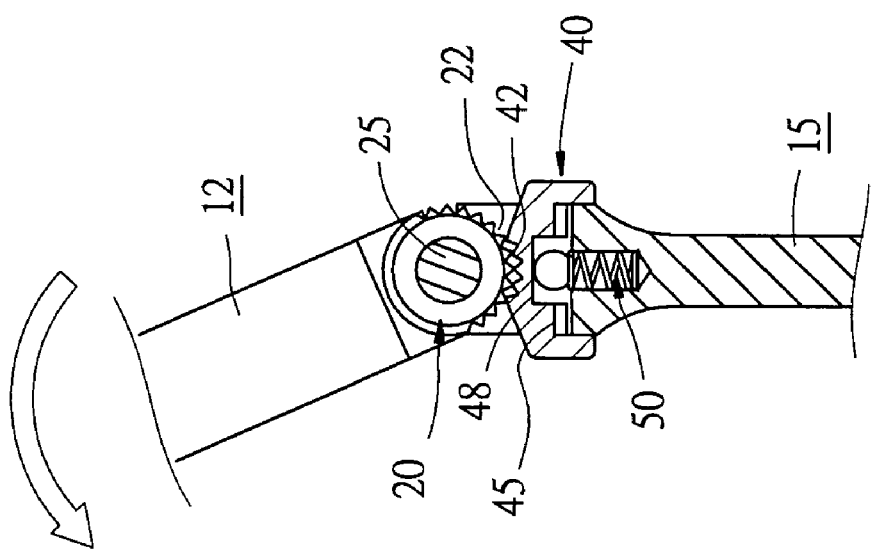
FIG. 9 shows that when the swinging joint swings, the shift button is resiliently moved rearward.

When the shift button 40 is positioned in the disengaged position, the stopper block 45 is not aligned with the stopper section 36 without interfering with each other. Under such circumstance, a user can pivot the head section 12. Referring to FIGS. 8 and 9, when pivoting the head section, the shift button 40 is pushed by the first pivot end 20 to move rearward. At this time, the shift button 40 and the first pivot end 20 are disengaged from each other. When the head section 12 is released from the pivoting force, the shift button 40 is pushed by the resilient unit 50 to again engage with the first pivot end 20.

Figure 7:
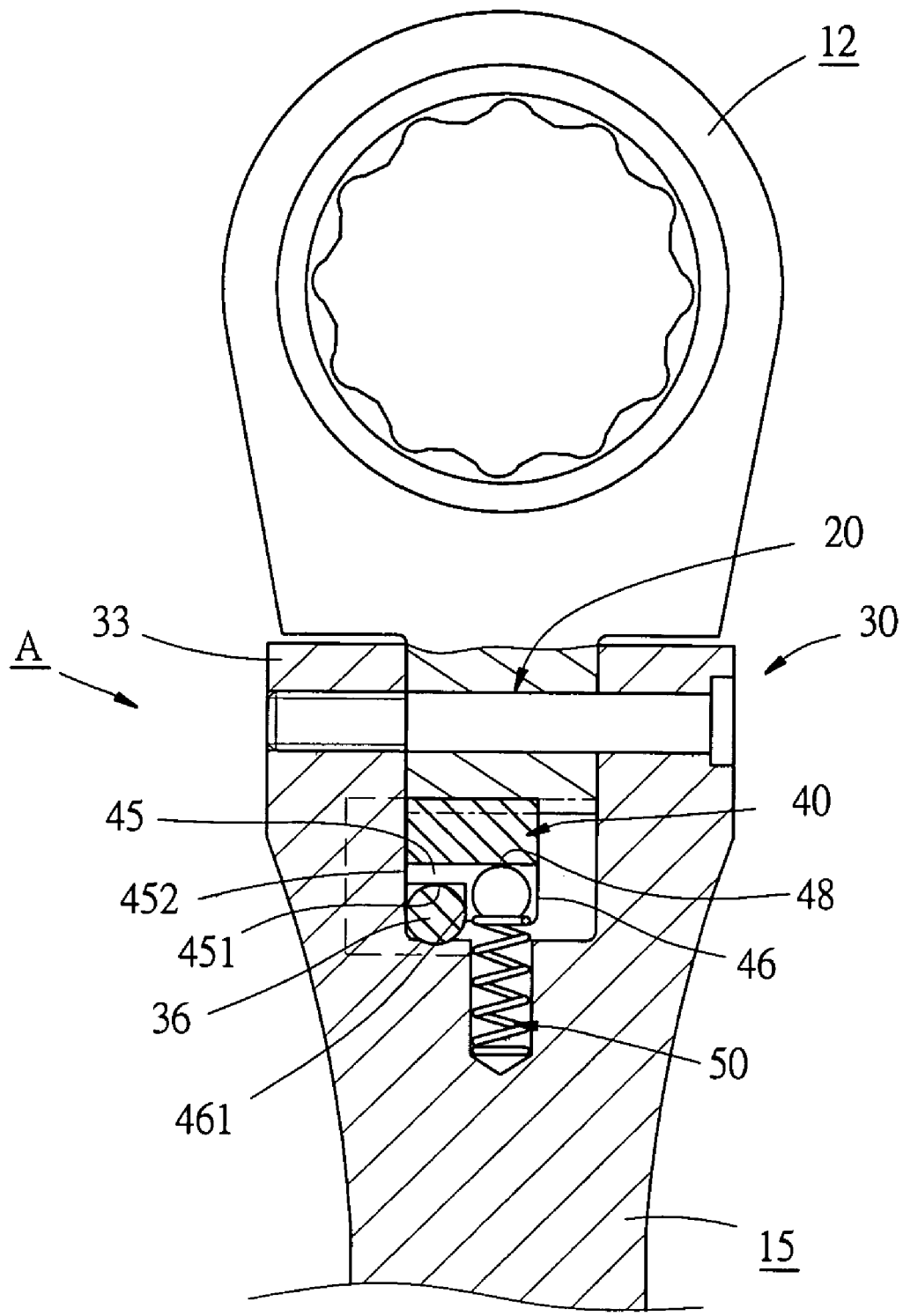
FIG. 7 is a sectional view according to FIG. 5, showing that the shift button is positioned in the engaged position.

When fixing the head section 12, the shift button 40 is shifted to the engaged position as shown in FIG. 7. At this time, the stopper block 45 is moved to a position right in front of the stopper section 36, where the stopper block 45 is stopped by the stopper section 36. Under such circumstance, the shift button 40 cannot be shifted rearward. Therefore, the first pivot end 20 is kept engaged with the shift button 40 without possibility of disengagement, whereby the head section is fixed at an adjusted angle.

When the shift button 40 is shifted back to the disengaged position, the angle of the head section can be readjusted.

Figure 10:
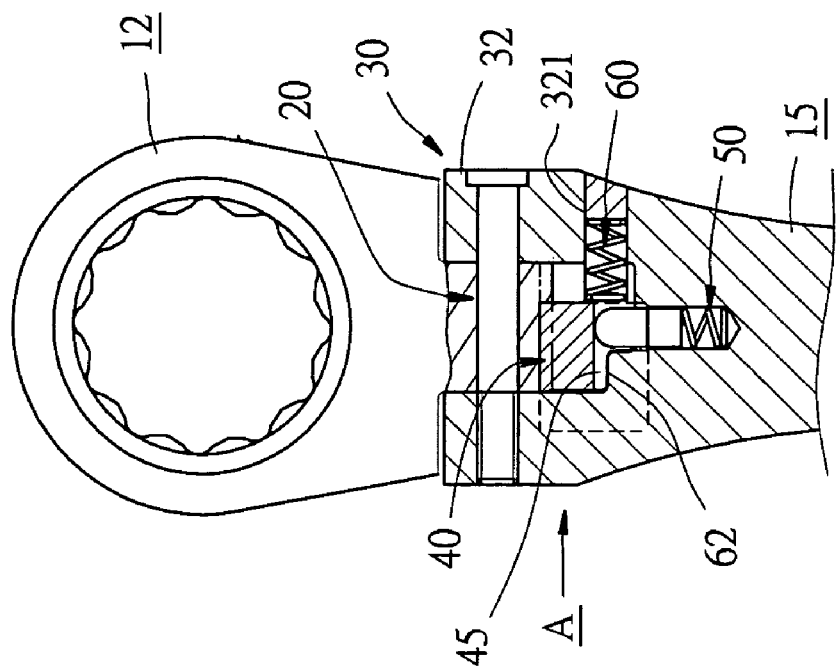
FIG. 10 is a longitudinal sectional view of a second embodiment of the present invention.

FIG. 10 shows a second embodiment of the hand tool 50 of the present invention, which is substantially identical to the first embodiment. The same components are denoted by the same reference numerals. The second embodiment is different from the first embodiment in that the second embodiment further includes a second resilient unit 60 mounted in a transverse hole 321 of the first lug 32. The resilient unit 60 pushes one side of the shift button 40 and keep it move toward the engaged position. Accordingly, in normal state, the shift button 40 is kept in the engaged position and the angle of the head section 12 is fixed. When adjusting the angle of the head section, the shift button 40 is shifted to the disengaged position, In addition, the stopper section 62 is directly integrally formed on the second pivot end.

Figure 11:
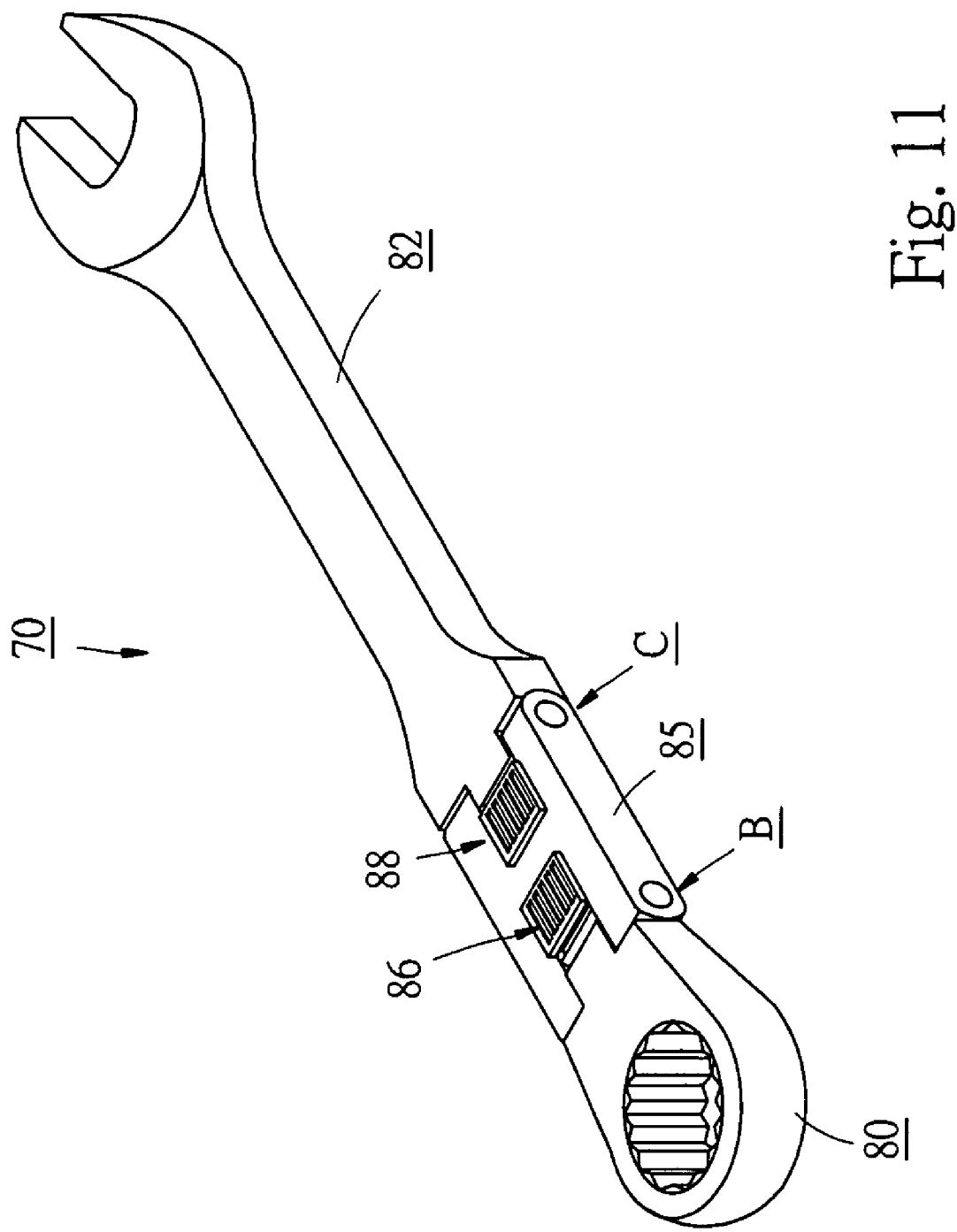
FIG. 11 is a perspective assembled view of a third embodiment of the present invention.

FIG. 11 shows a third embodiment of the hand tool 70 of the present invention, which includes a head section 80, a handle 82 and an adapter 85. The head section 80 is connected with the adapter 85 via a swinging joint B, while the handle 82 is connected with the adapter 85 via another swinging joint C. The two swinging joints B, C are respectively controlled by two shift buttons 86, 88 for locking or unlocking the swinging joints B, C. The swinging joints B, C can be the same as the swinging joint of the first or second embodiment.

In the above hand tool of the present invention, the stopper section serves as a rigid support for the shift button. Therefore, the shift button can firmly engage with the head section and prevent the head section from swinging. When the shift button is positioned in the engaged position, unless the shift button is manually shifted, the shift button will not leave the engaged position. Therefore, the swinging joint can be reliably fixed. The shift button has a structure simpler than the structure of the aforesaid U.S. Pat. No. 7,000,507. Therefore, it is easier to manufacture the shift button.

The above embodiments are only used to illustrate the present invention, not intended to limit the scope thereof. Many modifications of the above embodiments can be made without departing from the spirit of the present invention.

What is claimed is:

1. A hand tool with a swinging structure, comprising:
a head section; a handle connected with the head section via at least one swinging joint; and a shift button and a resilient unit disposed at the swinging joint, wherein:
the swinging joint is composed of a first pivot end and a second pivot end pivotally connected with each other, the first pivot end being a lug an outer circumference of which is formed with several teeth; the second pivot end being U-shaped and including a first and a second lugs side by side arranged and spaced from each other by a certain distance and a base section connected between the first and second lugs, the first and second lugs defining therebetween a cavity, the first pivot end being inserted in the cavity; a shaft being fitted through the two lugs and the first pivot end, whereby the head section can swing relative to the handle, the first pivot end being spaced from the base section of the second pivot end by a space; a stopper section being fixedly disposed on an inner face of the second pivot end in the space as a step protruding from the base section;
the shift button is reverse U-shaped and has a front end face, the front end face of the shift button being formed with at least one tooth, a stopper block being formed on an inner face of the shift button, the shift button being transversely and back and forth movably positioned in the space;
the resilient unit is disposed between the base section of the second pivot end and a rear end of the shift button, the resilient unit serving to resiliently push the shift button forwardly toward the first pivot end, whereby the tooth of the shift button keeps engaged with the teeth of the first pivot end; and
when the shift button is engaged with the first pivot end, a bottom face of the stopper block is higher than the stopper section, when the shift button is shifted toward the first lug into a disengaged position, the stopper block being positioned on one side of the stopper section, permitting the shift button to be resiliently moved rearward, when the shift button is horizontally shifted toward the second lug into an engaged position, the stopper block being just positioned in front of the stopper section and stopped by the stopper section, whereby the shift button cannot be moved rearward.

2. The hand tool as claimed in claim 1, wherein the stopper section is formed on the base section of the second pivot end.

3. The hand tool as claimed in claim 2, wherein a pin member is disposed on the base section of the second pivot end to serve as the stopper section.

4. The hand tool as claimed in claim 3, wherein a recess is formed on the base section, the pin member being fixedly disposed in the recess.

5. The hand tool as claimed in claim 1, wherein the stopper section is disposed on an inner face of the second lug.

6. The hand tool as claimed in claim 1, wherein the stopper section is integrally formed on the second pivot end.

7. The hand tool as claimed in claim 1, wherein the bottom of the stopper block of the shift button is formed with a transverse groove, the resilient unit extending into the groove to push the shift button.

8. The hand tool as claimed in claim 1, wherein when the shift button is positioned in the engaged position, a lateral side of the stopper block abuts against an inner face of the second lug.

9. The hand tool as claimed in claim 1, wherein a locating block further downward protrudes from the bottom of the stopper block of the shift button, a lateral face of the locating block facing the second lug being not aligned with a lateral face of the stopper block facing the second lug, whereby when the shift button is positioned in the engaged position, the lateral face of the locating block abuts against the stopper section.

10. The hand tool as claimed in claim 1, further comprises a second resilient unit mounted between the second pivot end and the shift button, the second resilient unit serving to laterally push the shift button to keep the shift button in the engaged position.

11. The hand tool as claimed in claim 10, wherein the second resilient unit is disposed between the first lug and the shift button.

12. The hand tool as claimed in claim 1, further comprises an adapter disposed between the head section and the handle, the rear end of the head section being pivotally connected with a front end of the adapter via one said swinging joint, while the front end of the handle being pivotally connected with a rear end of the adapter via another said swinging joint.

* * * * *